(12) United States Patent
Lee et al.

(10) Patent No.: US 8,806,279 B2
(45) Date of Patent: Aug. 12, 2014

(54) METHOD AND APPARATUS FOR BOOTING TO DEBUG IN PORTABLE TERMINAL

(75) Inventors: Sung-Jun Lee, Hwaseong-si (KR); Soo-Ho Noh, Suwon-si (KR); Young-Kyu Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 12/814,762

(22) Filed: Jun. 14, 2010

(65) Prior Publication Data

US 2010/0325482 A1 Dec. 23, 2010

(30) Foreign Application Priority Data

Jun. 18, 2009 (KR) ........................ 10-2009-0054302

(51) Int. Cl.
 *G06F 11/00* (2006.01)
(52) U.S. Cl.
 USPC ........... 714/36; 713/1; 713/2; 714/23; 714/24
(58) Field of Classification Search
 USPC ................................. 713/1, 2; 714/23, 24, 36
 See application file for complete search history.

(56) References Cited

U.S. PATENT DOCUMENTS

| | | | | |
|---|---|---|---|---|
| 5,594,903 A * | 1/1997 | Bunnell et al. | ................. | 717/162 |
| 6,629,267 B1 * | 9/2003 | Glerum et al. | ............. | 714/38.11 |
| 6,654,880 B1 * | 11/2003 | Yamamoto | ........................ | 713/1 |
| 6,769,077 B2 * | 7/2004 | Vachon et al. | .................. | 714/43 |
| 6,973,598 B2 * | 12/2005 | Masuyama et al. | ............. | 714/45 |
| 7,240,240 B2 * | 7/2007 | Balakrishnan et al. | ......... | 714/15 |
| 7,290,175 B1 * | 10/2007 | Kessler et al. | ................... | 714/37 |
| 7,302,559 B2 * | 11/2007 | Oguma | ............................ | 713/1 |
| 7,313,682 B2 * | 12/2007 | Kanapathipillai et al. | ........ | 713/2 |
| 7,321,957 B2 * | 1/2008 | Khan et al. | .................... | 711/152 |
| 7,398,430 B2 * | 7/2008 | Wang et al. | ..................... | 714/45 |
| 7,484,127 B2 * | 1/2009 | Babu | ........................ | 714/38.11 |
| 7,496,794 B1 * | 2/2009 | Eastham et al. | ................ | 714/37 |
| 7,583,457 B2 * | 9/2009 | Miller et al. | .................... | 360/30 |
| 7,590,838 B2 * | 9/2009 | Oguma | ............................ | 713/2 |
| 7,631,224 B2 * | 12/2009 | Oguma | ............................ | 714/37 |
| 7,681,080 B2 * | 3/2010 | Abali et al. | ..................... | 714/27 |
| 7,770,056 B2 * | 8/2010 | Malaviya | ..................... | 714/5.11 |
| 7,783,932 B1 * | 8/2010 | Eigen et al. | ..................... | 714/45 |
| 7,788,537 B1 * | 8/2010 | Yellen et al. | ............... | 714/38.11 |
| 7,805,636 B2 * | 9/2010 | Blanchard et al. | .............. | 714/37 |
| 7,882,223 B2 * | 2/2011 | Brahmavar | .................. | 709/224 |
| 7,937,610 B2 * | 5/2011 | Hare et al. | ...................... | 714/48 |
| 7,979,749 B2 * | 7/2011 | Jann et al. | ..................... | 714/38.1 |
| 7,996,720 B2 * | 8/2011 | Jung et al. | ........................ | 714/36 |
| 2002/0078404 A1 * | 6/2002 | Vachon et al. | ................... | 714/38 |
| 2003/0145142 A1 * | 7/2003 | Masuyama et al. | ........... | 710/100 |
| 2005/0091520 A1 * | 4/2005 | Khan et al. | .................... | 713/194 |
| 2005/0210228 A1 * | 9/2005 | Miller et al. | ...................... | 713/1 |
| 2005/0283672 A1 * | 12/2005 | Brown et al. | ................... | 714/31 |
| 2006/0010314 A1 * | 1/2006 | Xu | ..................... | 713/2 |
| 2006/0069944 A1 * | 3/2006 | Oguma | ............................ | 714/5 |
| 2006/0143430 A1 * | 6/2006 | Morrison et al. | ................ | 713/1 |
| 2006/0156057 A1 * | 7/2006 | Babu | ................................ | 714/5 |

(Continued)

*Primary Examiner* — Joshua P Lottich
(74) *Attorney, Agent, or Firm* — Jefferson IP Law, LLP

(57) ABSTRACT

A booting method and an apparatus thereof for debugging in a portable terminal are provided. The method includes, when a booting event occurs, stacking a boot loader in a preset boot loader region of a Random Access Memory (RAM), and executing, and stacking an Operating System (OS) in a preset OS region of the RAM, wherein the boot loader region and the OS region of the RAM are set such that they do not overlap each other.

9 Claims, 5 Drawing Sheets

(56) References Cited

U.S. PATENT DOCUMENTS

| | | | |
|---|---|---|---|
| 2006/0168439 A1* | 7/2006 | Oguma | 713/2 |
| 2006/0242627 A1* | 10/2006 | Wygodny et al. | 717/128 |
| 2008/0005609 A1* | 1/2008 | Zimmer et al. | 714/5 |
| 2008/0098209 A1* | 4/2008 | Malaviya | 713/2 |
| 2008/0155082 A1* | 6/2008 | Ohtani et al. | 709/223 |
| 2009/0024820 A1* | 1/2009 | Ponnuswamy | 711/170 |
| 2009/0037649 A1* | 2/2009 | Xu | 711/103 |
| 2010/0180108 A1* | 7/2010 | Liu | 713/2 |

* cited by examiner

METHOD AND APPARATUS FOR BOOTING TO DEBUG IN PORTABLE TERMINAL

PRIORITY

This application claims the benefit under 35 U.S.C. §119(a) of a Korean patent application filed in the Korean Intellectual Property Office on Jun. 18, 2009 and assigned Serial No. 10-2009-0054302, the entire disclosure of which is hereby incorporated by reference.

BACKGROUND OF THE INVENTION

1. Field of the Invention

The present invention relates to a booting method and an apparatus thereof for debugging in a portable terminal. More particularly, the present invention relates to a method and an apparatus for performing booting such that a boot loader region and an operating system region do not overlap.

2. Description of the Related Art

To meet the trend of small-sized and lightweight products with Very Large Scale Integration (VLSI) developments and a computing technique, various small-sized portable terminals have been introduced. As the demand for a small-sized and lightweight portable terminal rapidly increases, additional functions provided to the portable terminal are diversified. As the additional functions provided to the portable terminal are diversified, a program in the portable terminal becomes more complicated, and an unexpected defect of the program, that is, a malfunction of the program occurs frequently.

Generally, when a malfunction of a program occurs in the portable terminal, information regarding the malfunction is obtained from a Random Access Memory (RAM) using a debugging tool, and the malfunction is resolved. However, in a case where a malfunction such as a lockup and an operation stoppage of the portable terminal occurs, information regarding the malfunction cannot be obtained even when the above debugging tool is used. For example, in a case where an error occurs in an Operating System (OS) of the portable terminal and rebooting is performed, a portion of data stored in the RAM is deleted due to the booting process and the information regarding the erroneous OS cannot be obtained.

FIG. 1 is a view illustrating a RAM in a case where an OS is normally stacked according to the related art, and FIG. 2 is a view illustrating a RAM in a case where rebooting is performed according to the related art. Referring to FIG. 1, the booting process denotes a process in which a boot loader 100 stacked in a RAM stacks an OS 110 stored in a flash memory in the RAM. That is, referring to FIG. 2, when an error occurs 200 in the OS, the portable terminal performs a rebooting process, which is a process of turning off power and performing booting. At this point, the portable terminal uses a boot loader stacked in a preset region 220 of the RAM in order to perform booting, and the region 220 in which the boot loader is stacked may overlap a region 210 in which the OS has been stacked before the rebooting. In this case, a portion of data regarding the erroneous OS is deleted, so that debugging for resolving the error cannot be performed.

Therefore, a need exists for a method and an apparatus for performing a booting process for debugging in a portable terminal.

SUMMARY OF THE INVENTION

An aspect of the present invention is to address at least the above-mentioned problems and/or disadvantages and to provide at least the advantages described below. Accordingly, an aspect of the present invention is to provide a booting method and an apparatus thereof for debugging in a portable terminal.

Another aspect of the present invention is to provide a booting method and an apparatus thereof for obtaining data for debugging in a case where an error occurs in an OS in a portable terminal.

Still another aspect of the present invention is to provide a booting method and an apparatus thereof for configuring a memory map such that a boot loader region and an OS region do not overlap each other.

In accordance with an aspect of the present invention, a booting method for debugging in a portable terminal is provided. The method includes, when a booting event occurs, stacking a boot loader in a preset boot loader region of a Random Access Memory (RAM), and executing the same, and stacking an Operating System (OS) in a preset OS region of the RAM, wherein the boot loader region and the OS region of the RAM are set such that the boot loader region and the OS region do not overlap each other.

In accordance with another aspect of the present invention, a booting apparatus for debugging in a portable terminal is provided. The apparatus includes a Random Access Memory (RAM) for, when a booting event occurs, stacking a boot loader in a preset boot loader region and executing the same, and stacking an Operating System (OS) in a preset OS region, wherein the boot loader region and the OS region of the RAM are set such that the boot loader region and the OS region do not overlap each other.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a booting method and an apparatus thereof for obtaining data for debugging in a case where an error occurs in an Operating System (OS) in a portable terminal.

Figure 1:
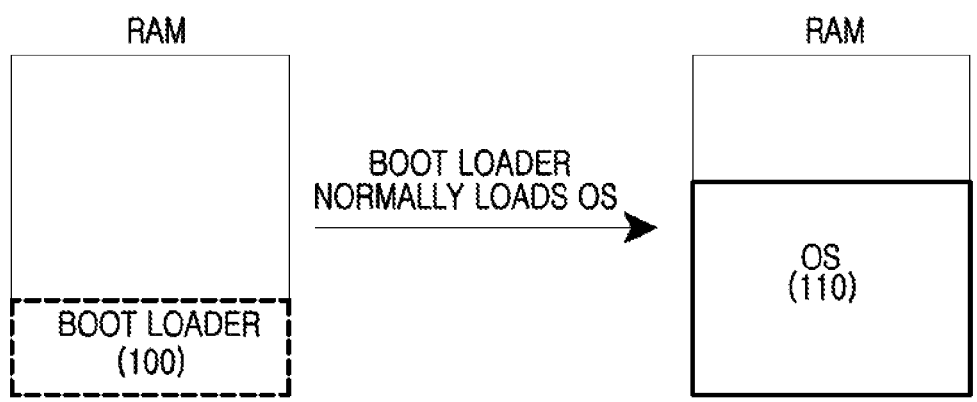
FIG. 1 is a view illustrating a RAM in a case where an Operating System (OS) is normally stacked according to the related art.
Figure 2:
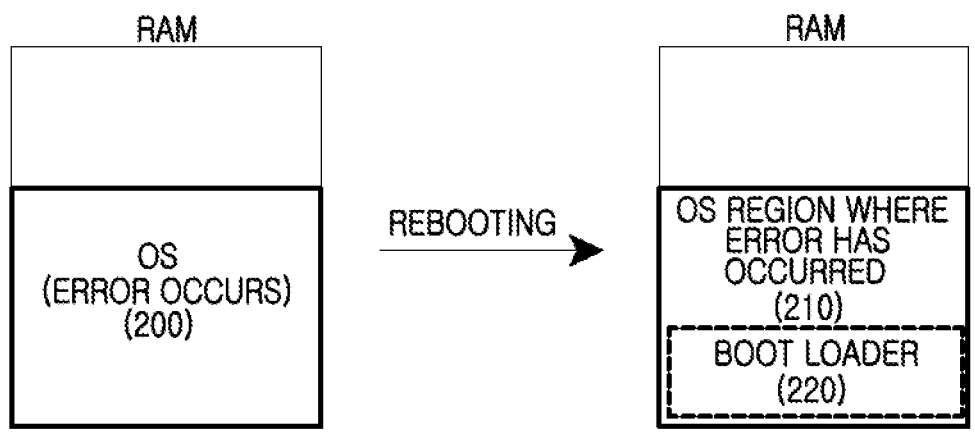
FIG. 2 is a view illustrating a RAM in a case where rebooting is performed according to the related art.
Figure 3:
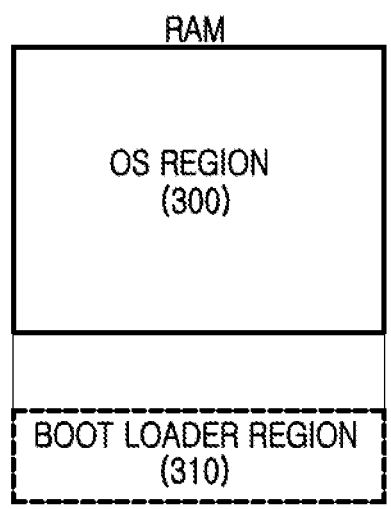
FIG. 3 is a view illustrating a RAM including a boot loader region and an OS region separated from each other according to an exemplary embodiment of the present invention.

FIG. 3 is a view illustrating a Random Access Memory (RAM) including a boot loader region and an OS region separated from each other according to an exemplary embodiment of the present invention.

Referring to FIG. 3, a map of a RAM is configured such that a boot loader region 310 and an OS region 300 do not overlap each other. That is, the RAM is configured such that the boot loader region 310 and the OS region 300 do not overlap each other by designating, in advance, start addresses of the RAM at which the boot loader and the OS are to be stacked, respectively, with consideration of sizes of the boot loader and the OS when designing a portable terminal. For example, when a start address of the RAM is 0x800000, and the size of the boot loader is 2000, the start address of the boot loader region 310 is set to 0x800000, and the start address of the OS region 300 is set to 0x805000, so that the two regions do not overlap each other.

As described above, debugging data may be obtained when an error occurs in the OS and rebooting is performed, as the map of the RAM is configured such that the boot loader region 310 and the OS region 300 do not overlap each other. The rebooting performed in the RAM will be described in more detail with reference to FIG. 4.

Figure 4:
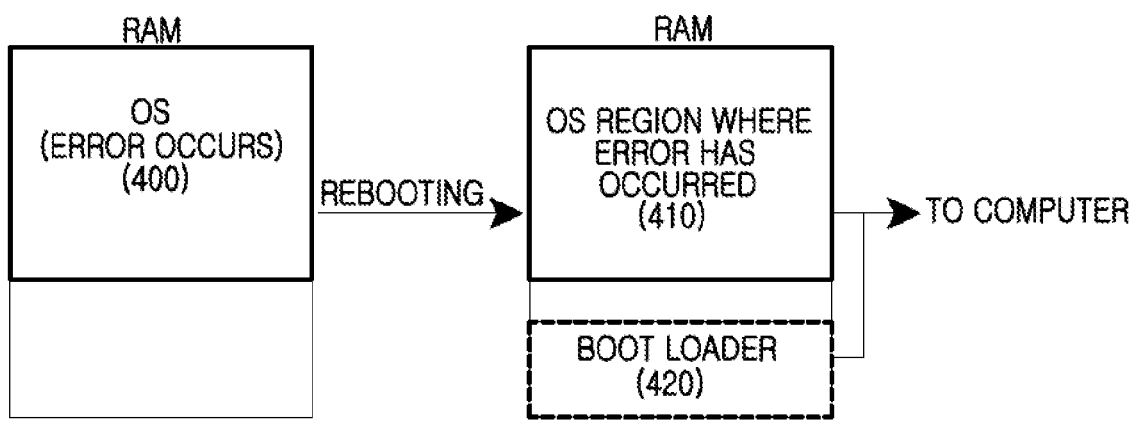
FIG. 4 is a view illustrating a RAM in a case where rebooting is performed according to an exemplary embodiment of the present invention.

FIG. 4 is a view illustrating a RAM in a case where rebooting is performed according to an exemplary embodiment of the present invention.

Referring to FIG. 4, in a case where an error occurs in the OS 400 during an operation of a portable terminal and rebooting is performed, a boot loader for performing a booting process is stacked in a preset region 420. That is, a boot loader for performing a booting process is stacked in a region that does not overlap an OS region, so that data of the OS region 410 where the error has occurred before the rebooting are not damaged. Here, the boot loader may obtain data regarding the OS where the error has occurred before the rebooting by dumping data of the OS 410 before stacking an OS stored in a flash memory (not illustrated) in the preset OS region 410 when performing the rebooting. At this point, the boot loader may transmit the dumped data to a computer connected via a Universal Serial Bus (USB), and the computer may change the received data to a file that may be debugged.

Figure 5:
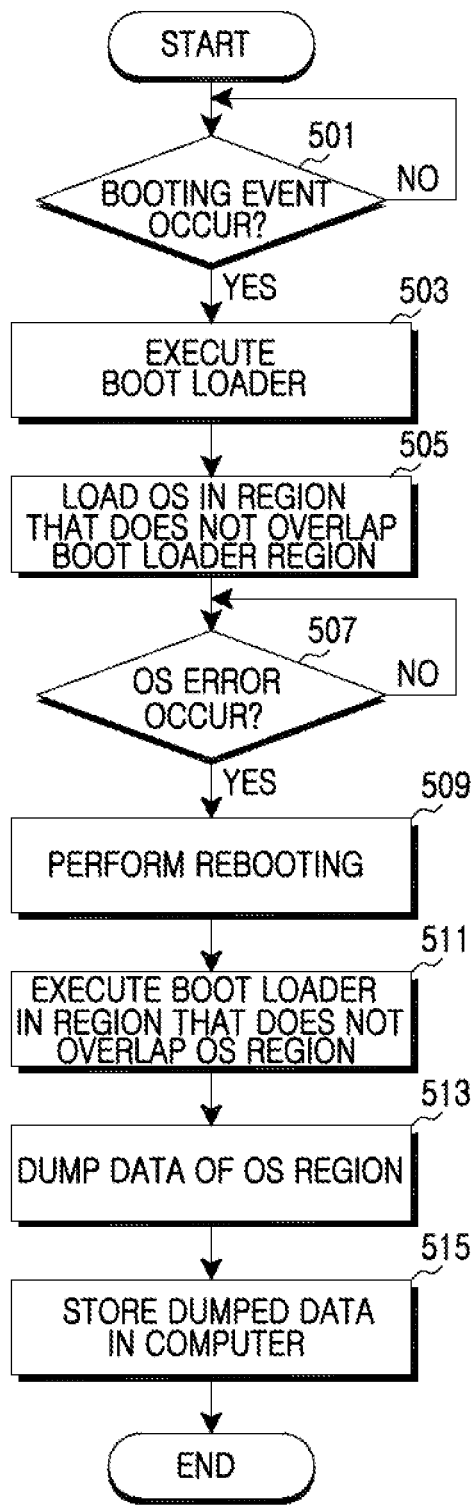
FIG. 5 is a flowchart illustrating an operating procedure of a portable terminal according to an exemplary embodiment of the present invention.

FIG. 5 is a flowchart illustrating an operating procedure of a portable terminal according to an exemplary embodiment of the present invention.

Referring to FIG. 5, when a booting event occurs in step 501, the portable terminal stacks a boot loader in the preset boot loader region 310 of a RAM, as illustrated in FIG. 3, to execute the boot loader in step 503. The portable terminal also stacks an OS in a preset region of the RAM, that is, the OS region 300 that does not overlap the boot loader region 310 using the boot loader in step 505.

The portable terminal determines whether an error occurs in the OS in step 507. When the error occurs in the OS as a result of the determination, the portable terminal performs rebooting. That is, the portable terminal performs a process for turning off power and performing booting again in step 509. At this point, the portable terminal stacks a boot loader in the preset boot loader region of the RAM which is set such that the boot loader region does not overlap the OS region in step 511 as illustrated in FIG. 4, and executes the same.

The portable terminal obtains data regarding the OS where an error has occurred before the rebooting by dumping the data regarding the OS using the boot loader in step 513, and transmits the dumped data to a connected computer in step 515. At this point, the portable terminal and the computer may be connected via a USB, and a process of transmitting/receiving the dumped data via the USB uses the general techniques used in the related art.

Exemplary embodiments of the present invention provide a memory map that is configured such that a region in which a boot loader is stacked and a region in which an OS is stacked are discriminated in a portable terminal. Accordingly, data for debugging may be obtained when an error occurs in the OS and rebooting is performed.

While the invention has been shown and described with reference to certain exemplary embodiments thereof, it will be understood by those skilled in the art that various changes in form and details may be made therein without departing from the spirit and scope of the invention as defused by the appended claims and their equivalents.

What is claimed is:

1. A booting method for debugging in a portable terminal, the method comprising:
   when a booting event occurs, stacking a boot loader in a preset boot loader region of a Random Access Memory (RAM), and executing the same;
   stacking an Operating System (OS) in a preset OS region of the RAM; and
   if an OS error occurs, dumping data stored in advance in the OS region using the boot loader before the stacking of the OS in the preset OS region,
   wherein the boot loader region and the OS region of the RAM are set such that the boot loader region and the OS region do not overlap each other, and
   wherein the dumping of the data stored in the OS region comprises identifying, by the portable terminal, dump data, and transferring, by the portable terminal, the identified dump data to a computer connected to the portable terminal via a Universal Serial Bus (USB) connection.

2. The method of claim 1, further comprising designating, in advance, start addresses of the RAM at which the boot loader and the OS are to be stacked.

3. A booting apparatus for debugging in a portable terminal, the apparatus comprising:
   a Random Access Memory (RAM) for, when a booting event occurs, stacking a boot loader in a preset boot loader region and executing the same, and stacking an Operating System (OS) in a preset OS region, and a controller, wherein the preset boot loader region and the preset OS region of the RAM are set such that the preset boot loader region and the preset OS region do not overlap each other, and wherein, if an OS error occurs, the controller identifies dump data and operatively transfers the identified dump data to a computer connected to the portable terminal via a Universal Serial Bus (USB) connection, and wherein, if an OS error occurs, the RAM dumps data stored in advance in the OS region using the boot loader before the stacking of the OS in the preset OS region.

4. The apparatus of claim 3, wherein the preset boot loader region and the preset OS region do not overlap each other by designating, in advance, start addresses of the RAM at which the boot loader and the OS are to be stacked.

5. A booting method for debugging in a portable terminal, the method comprising:

stacking a boot loader in a preset boot loader region of a Random Access Memory (RAM), when a booting event occurs;

stacking an Operating System (OS) in a preset OS region that does not overlap the boot loader region using the boot loader;

determining whether an error occurs in the OS;

performing rebooting, if it is determined that an error occurs in the OS;

identifying dump data;

transferring the identified dump data to a computer connected to the portable terminal via a Universal Serial Bus (USB) connection; and dumping data stored in advance in the OS region using the boot loader before the stacking of the OS in the preset OS region, if it is determined that an error occurs in the OS.

6. The method of claim 5, further comprising stacking a boot loader in the preset boot loader region of the RAM such that the preset boot loader region does not overlap the preset OS region.

7. The method of claim 6, further comprising designating, in advance, start addresses of the RAM at which the boot loader and the OS are to be stacked.

8. The method of claim 7, wherein the identifying of the dump data comprises obtaining data regarding the OS where the error has occurred before the rebooting.

9. The method of claim 8, wherein the obtaining of the data comprises dumping the data regarding the OS using the boot loader.

* * * * *